United States Patent
Al-Haj Ali et al.

(10) Patent No.: US 10,759,880 B2
(45) Date of Patent: Sep. 1, 2020

(54) PROCESS FOR RECOVERING HYDROCARBONS IN A SOLUTION POLYMERISATION PROCESS

(71) Applicant: Borealis AG, Vienna (AT)

(72) Inventors: Mohammad Al-Haj Ali, Helsinki (FI); Erik Eriksson, Stenungsund (SE); Guhan Mathivanan, Linz (AT); Henry Sleijster, Echt (NL); Sameer Vijay, Linz (AT); Christof Wurnitsch, Neufelden (AT); Samuli Zitting, Tuusula (FI)

(73) Assignee: Borealis AG, Vienna (AT)

( * ) Notice: Subject to any disclaimer, the term of this patent is extended or adjusted under 35 U.S.C. 154(b) by 107 days.

(21) Appl. No.: 15/781,733

(22) PCT Filed: Dec. 21, 2016

(86) PCT No.: PCT/EP2016/082199
§ 371 (c)(1),
(2) Date: Jun. 6, 2018

(87) PCT Pub. No.: WO2017/108963
PCT Pub. Date: Jun. 29, 2017

(65) Prior Publication Data
US 2018/0355075 A1  Dec. 13, 2018

(30) Foreign Application Priority Data

Dec. 21, 2015 (EP) .................................... 15201462
Jul. 15, 2016 (EP) .................................... 16179643

(51) Int. Cl.
| | | |
|---|---|---|
| C08F 6/12 | (2006.01) | |
| C08F 2/06 | (2006.01) | |
| C08F 6/00 | (2006.01) | |
| B01D 3/14 | (2006.01) | |
| B01D 3/42 | (2006.01) | |
| C08F 6/04 | (2006.01) | |
| C08F 10/02 | (2006.01) | |
| C08F 10/06 | (2006.01) | |
| C08F 36/02 | (2006.01) | |

(52) U.S. Cl.
CPC ............... *C08F 6/12* (2013.01); *B01D 3/143* (2013.01); *B01D 3/42* (2013.01); *C08F 2/06* (2013.01); *C08F 6/003* (2013.01); *C08F 6/04* (2013.01); *C08F 10/02* (2013.01); *C08F 10/06* (2013.01); *C08F 36/02* (2013.01)

(58) Field of Classification Search
USPC ........................................................ 528/501
See application file for complete search history.

(56) References Cited

U.S. PATENT DOCUMENTS

| 2,691,647 A | 10/1954 | Field et al. |
| 5,001,205 A | 3/1991 | Hoel |
| 5,001,244 A | 3/1991 | Welborn, Jr. |

FOREIGN PATENT DOCUMENTS

| EP | 0280352 A1 | 2/1988 |
| EP | 0280353 A1 | 2/1988 |
| EP | 0286148 A1 | 10/1988 |
| WO | 8703604 A1 | 6/1987 |
| WO | 9325590 A1 | 12/1993 |
| WO | 9736942 A1 | 10/1997 |
| WO | 2006026493 A1 | 3/2006 |
| WO | 2006083515 A1 | 8/2006 |
| WO | 2008024517 A2 | 2/2008 |
| WO | 2008082511 A1 | 7/2008 |
| WO | 2008109094 A1 | 9/2008 |
| WO | 2009080710 A1 | 7/2009 |
| WO | 2012141974 A1 | 10/2012 |
| WO | 2014138854 A1 | 9/2014 |
| WO | 2015022079 A1 | 2/2015 |
| WO | 2015040522 A1 | 3/2015 |
| WO | 2015109184 A1 | 7/2015 |

OTHER PUBLICATIONS

International Search Report & Written Opinion issued in International Application No. PCT/EP2016/082199; dated May 11, 2017.

*Primary Examiner* — Terressa Boykin
(74) *Attorney, Agent, or Firm* — Insigne LLP

(57) ABSTRACT

A process for producing a polymer composition comprising the steps (A) to (M) as recited herein, involving the polymerization, in a polymerization reactor of a first polymer, a first stream thereof being passed into a first separator wherein a first liquid phase comprising the polymer and a first vapor phase coexist; withdrawing a first vapor stream and a first concentrated solution stream comprising the polymer from the first separator, passing at least a part of the first vapor stream to a first fractionator; withdrawing a first overhead stream and a first bottom stream from the first fractionator; recovering at least a part of the first overhead stream as a first recycle stream and passing it to the polymerization reactor; passing the first concentrated solution stream from the first separator to a second separator, wherein a second liquid phase comprising the polymer and a second vapor phase coexist; passing at least a part of the second vapor stream to a second fractionator; withdrawing a second overhead stream and a second bottom stream from the second fractionator; recovering at least a part of the second overhead stream as a second recycle stream and passing it to the polymerization reactor; wherein the mass flow rate of the first recycle stream is at least 80% of the mass flow rate of the first vapor stream and the mass flow rate of the second recycle stream is at least 70% of the mass flow rate of the second vapor stream.

18 Claims, 2 Drawing Sheets

PROCESS FOR RECOVERING HYDROCARBONS IN A SOLUTION POLYMERISATION PROCESS

FIELD OF THE INVENTION

The present invention relates to a solution polymerisation process. More specifically, the present invention deals with separating and recovering the volatile components of the reaction mixture downstream of the polymerisation process.

Problem to Be Solved

It is known to produce olefin polymers in solution polymerisation process where the unreacted monomer and comonomer and the solvent are separated from the solution and recycled to the polymerisation process.

WO-A-2008109094 disclosed a process for recovering volatile components from polymer solution. The liquid-liquid separation process returns the volatile components to the polymerisation reactors optionally via one or more separation towers.

U.S. Pat. No. 2,691,647 discloses a solution polymerisation process with two-step recovery of volatile hydrocarbons from the polymer solution.

WO-A-2014138854 discloses a solution polymerisation process where solution from at least one polymerisation reactor is passed to a vapour-liquid separator and at least 60% of formed vapour stream is recycled back to polymerisation reactors. The rest of the vapour stream is sent to distillation. Energy consumption is reduced by recycling a part of the vapour stream. In addition low pressure steam is generated during a condensation step of the vapour phase.

WO-A-2015022079 discloses a solution polymerisation process where the solution from the polymerisation reactor is firstly passed through a washing step and then through three subsequent concentration stages. The process does not provide any means for recycling the unreacted monomer and comonomer. Only solvent is recycled.

WO-A-2015040522 discloses a solution polymerisation process where the solution from the polymerisation reactor is passed through three subsequent concentration stages. Only solvent is recycled from the second and third concentration stage.

In spite of the prior art there still remains a need for an efficient process for removing and recovering residual hydrocarbons from the polymer solution. The present invention provides an improved process for recovering components of the reaction mixture and thereby reduces the energy consumption of the recovery section.

SUMMARY OF THE INVENTION

The present invention provides a process for producing a polymer composition comprising the steps of:
(A) polymerising, in a first polymerisation reactor (2) in a first solvent,
a first olefin monomer having two or more carbon atoms and
optionally a first comonomer,
in the presence of a first polymerisation catalyst and optionally a chain transfer agent for producing a first solution comprising a first polymer of the first olefin monomer and the optional first comonomer and the first solvent;
(B) withdrawing a first stream of the first solution from the first polymerisation reactor (2);
(C) passing the first stream of the first solution into a first separator (4) wherein a first liquid phase comprising the polymer and a first vapour phase coexist;
(D) withdrawing a first vapour stream and a first concentrated solution stream comprising the polymer from the first separator (4);
(E) passing at least a part of the first vapour stream to a first fractionator (5);
(F) withdrawing a first overhead stream and a first bottom stream from the first fractionator (5);
(G) recovering at least a part of the first overhead stream as a first recycle stream and passing it to the first polymerisation reactor (2);
(H) passing the first concentrated solution stream from the first separator (4) to a second separator (8) wherein a second liquid phase comprising the polymer and a second vapour phase coexist;
(I) withdrawing a second vapour stream and a second concentrated solution stream comprising the polymer from the second separator (8);
(J) passing at least a part of the second vapour stream to a second fractionator (12);
(K) withdrawing a second overhead stream and a second bottom stream from the second fractionator (12);
(L) recovering at least a part of the second overhead stream as a second recycle stream and passing it to the first polymerisation reactor (2);
(M) passing the second concentrated solution stream from the second separator (8) to a third separator (11) wherein a third liquid phase comprising the polymer and a third vapour phase coexist;
characterised in that the mass flow rate of the first recycle stream is at least 80% of the mass flow rate of the first vapour stream and the mass flow rate of the second recycle stream is at least 70% of the mass flow rate of the second vapour stream.

The polymerisation of the process of the present invention can be conducted in one or more polymerisation reactors connected in parallel configuration. In one aspect of the process of the present invention polymerisation step (A) is the only polymerisation step so that no polymerisation reactors are connected in parallel configuration.

Alternatively, the process of the present invention can comprise a parallel polymerisation reactor configuration with two or more polymerisation steps in two or more polymerisation reactors in parallel configuration.

Thus, in an alternative aspect of the present invention the process of the present invention further comprises the additional steps of:
(T) polymerising, in a second polymerisation reactor (14) in a second solvent,
a second olefin monomer having two or more carbon atoms and
optionally a second comonomer,
in the presence of a second polymerisation catalyst and optionally a chain transfer agent for producing a second solution comprising a second polymer of second olefin monomer and the optional second comonomer and the second solvent;
(U) withdrawing a first stream of the second solution from the second polymerisation reactor (14)
(V) passing the first stream of the second solution into a fourth separator (16) wherein a fourth liquid phase comprising the polymer and a fourth vapour phase coexist;
(W) withdrawing a fourth vapour stream and a fourth concentrated solution stream comprising the polymer from the fourth separator (16);

(X) passing at least a part of the fourth vapour stream to a fourth fractionator (18);

(Y) withdrawing a fourth overhead stream and a fourth bottom stream from the fourth fractionator (18);

(Z) recovering at least a part of the fourth overhead stream as a fourth recycle stream and passing it to the second polymerisation reactor (14);

(AA) passing the fourth concentrated solution stream from the fourth separator (16) to the second separator (8) wherein the second liquid phase comprising the polymer and the second vapour phase coexist;

characterised in that the polymerisation in the first polymerisation reactor (2) in step (A) and the polymerisation in the second polymerisation reactor (14) in step (T) are conducted in parallel configuration;

and the mass flow rate of the fourth recycle stream is at least 80% of the mass flow rate of the fourth vapour stream.

Alternatively, in the parallel reactor configuration the first stream of the first solution and the first stream of the second solution can be combined before being passed into the first separator.

Thus, in another alternative aspect of the present invention the process of the present invention further comprises the additional steps of:

(T') polymerising, in a second polymerisation reactor (14) in a second solvent,
  a second olefin monomer having two or more carbon atoms and
  optionally a second comonomer,
  in the presence of a second polymerisation catalyst and optionally a chain transfer agent for producing a second solution comprising a second polymer of second olefin monomer and the optional second comonomer and the second solvent;

(U') withdrawing a first stream of the second solution from the second polymerisation reactor (14);

(V') combining the first stream of the second solution from the second polymerisation reactor (14) with the first stream of the first solution from the first polymerisation reactor (2) to produce a combined first stream of the first solution and the second solution;

(W') passing the combined first stream of the first solution and the second solution into a first separator (4) wherein a first liquid phase comprising the polymer and a first vapour phase coexist;

characterised in that the polymerisation in the first polymerisation reactor (2) in step (A) and the polymerisation in the second polymerisation reactor (14) in step (T') are conducted in parallel configuration.

DEFINITION

Figure 1:
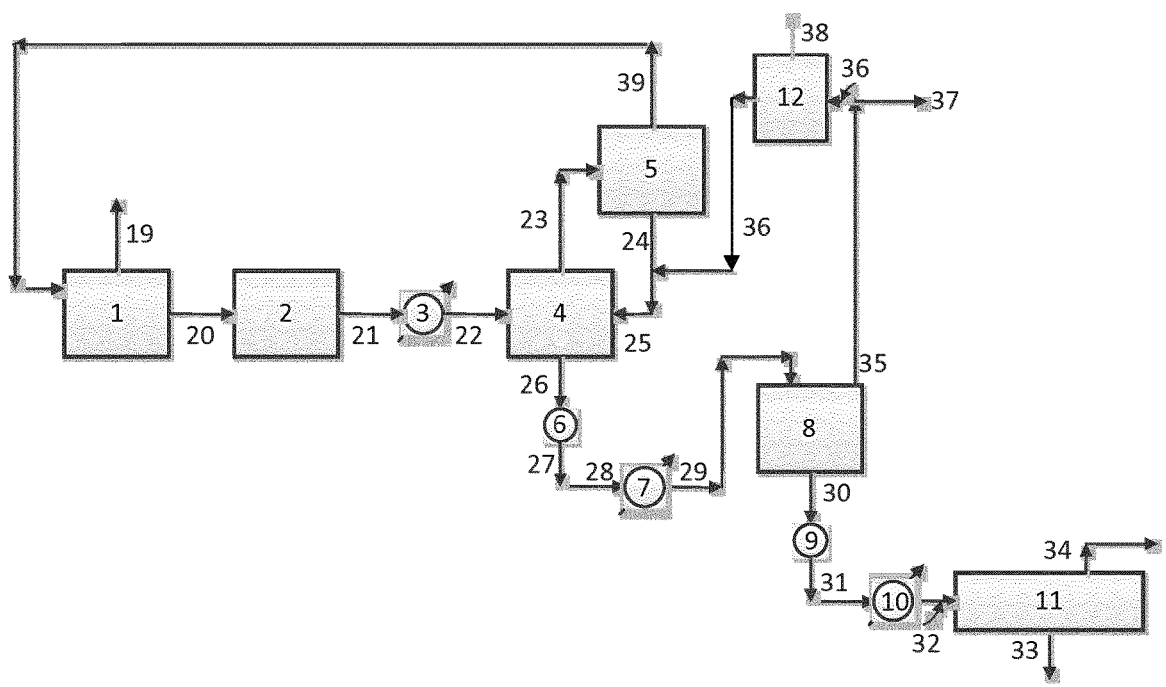
FIG. 1 shows a flow diagram for recovery of the unreacted monomer and comonomer and the solvent in a single polymerisation reactor configuration. The first and second overhead streams are recycled to the polymerisation reactors.

A single polymerisation reactor configuration means that no other polymerisation reactors are connected in parallel configuration.

A parallel polymerisation reactor configuration means that two or more, preferably two polymerisation reactors are connected in parallel configuration.

In the single polymerisation reactor configuration as well as in the parallel polymerisation reactor configuration two or more polymerisation reactors can be connected in series, i.e. the effluent of an upstream polymerisation reactor is fed to the next polymerisation reactor downstream of the reactor cascade. However, it is preferred that in the single polymerisation reactor configuration and in the parallel polymerisation reactor configuration no polymerisation reactors are connected in series.

DETAILED DESCRIPTION

The present invention is directed to a process for polymerising one or more olefins in one or more polymerisation reactors in solution. The solution polymerisation process is typically conducted in a solvent in which the monomer, eventual comonomers, eventual chain transfer agent and the polymer formed in course of the process are dissolved. Such processes are disclosed, among others, in WO-A-1997/036942, WO-A-2006/083515, WO-A-2008/082511, and WO-A-2009/080710.

Polymerisation

The polymerisation may be conducted in one or more polymerisation reactors. It is obvious that where the text refers to one polymerisation reactor it can be equally applied to more than one reactor, and in specific to any one of the reactors. In addition, where a reference to more than one reactor has been made it can be equally applied to one polymerisation reactor.

In the polymerisation reactors olefin monomers having two or more carbon atoms, one or more catalyst systems, optionally one or more comonomers, optionally one or more chain transfer agents, and optionally one or more diluents or solvents are used for conducting a polymerisation. Thus, the polymerisation system for each reactor is in its dense fluid state and comprises the olefin monomers, any comonomer present, any diluent or solvent present, any chain transfer agent present, and the polymer product.

The olefin monomer is an olefin having two or more carbon atoms, preferably an alpha olefin having two or more carbon atoms, more preferably from 2 to 10 carbon atoms. Still more preferably the olefin monomer is selected from the group consisting of ethylene, propylene and 1-butene. Especially preferably the olefin monomer is ethylene or propylene.

One or more comonomers are optionally and preferably present in at least one of the polymerisation reactors. The comonomer is preferably selected from the group consisting of alpha-olefins different from the olefin monomer having from 2 to 10 carbon atoms; polyenes, such as non-conjugated alpha-omega-dienes, having from 4 to 10 carbon atoms, cyclic olefins having from 6 to 20 carbon atoms and cyclic polyenes having from 6 to 20 carbon atoms. Preferably, the comonomer is selected from the group of alpha-olefins different from the olefin monomer having from 2 to 10 carbon atoms, such as 1-butene, 1-hexene and 1-octene when the olefin monomer is ethylene; and ethylene, 1-butene and 1-hexene when the olefin monomer is propylene.

Suitably the comonomer is present in both of the polymerisation reactors. Same comonomer may be used in both polymerisation reactors but they may also be different if required, for instance, by product properties. Furthermore, the concentrations of the comonomer or comonomers in the two reactors are suitably different from each other. This allows production of homogeneous blends of two different polymers. However it is also possible to operate the reactors so that the concentrations of the comonomer or comonomers in the two reactors are the same.

The polymerisation catalyst may be any catalyst known in the art which is capable of polymerising the monomer and the optional comonomer. Thus, the polymerisation catalyst may be a Ziegler-Natta catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244, or it may be a combination of these. Also other suitable catalysts, such as late transition metal catalysts, can be used.

A chain transfer agent may be used in one or both of the polymerisation reactors for controlling the molecular weight of the polymer as it is known in the art. A suitable chain transfer agent is, for instance, hydrogen. By maintaining different concentrations of the chain transfer agent in the two reactors it is possible to produce a polymer blend having a broadened molecular weight distribution.

It is self-explaining that the reaction conditions applied within the different reactors need not be the same but may be different when compared with each other. This allows the production of different polymers which finally are blended together. As the reaction conditions can be adjusted completely independent for the further reactor(s), the options for varying the microstructure of the polymers to be blended are very broad.

The solvent is suitably present in the polymerisation process. The solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. The solvent must be inert towards the polymerisation catalyst and the monomers. Further, it should be stable in the polymerisation conditions. It further must be able to dissolve the monomer, the eventual comonomers, the eventual chain transfer agent and the polymer in the polymerisation conditions.

The temperature in the polymerisation reactor(s) is such that the polymer formed in the polymerisation reaction is completely dissolved in the reaction mixture comprising the solvent, the comonomer(s), the chain transfer agent and the polymer. Then, for instance, the first solution is formed in the first polymerisation reactor. The temperature is suitably greater than the melting temperature of the polymer. Thus, when the polymer is a homo- or copolymer of ethylene the temperature is suitably from 120° C. to 240° C., such as from 140° C. to 220° C., most preferably from 150° C. to 200° C., depending on the content of comonomer units in the polymer. When the polymer is a homo- or copolymer of propylene the temperature is suitably from 120° C. to 250° C., such as from 140° C. to 235° C., most preferably from 150° C. to 225° C., depending on the content of comonomer units in the polymer.

The pressure in the polymerisation reactor(s) depends on the temperature, on one hand, and the type and the amount of the comonomer, on the other hand. The pressure is suitably from 50 to 300 bar, preferably from 60 to 250 bar and more preferably from 70 to 200 bar.

The residence time is short, typically less than 10 minutes.

The process is suitably operated continuously. Thereby streams of monomer, catalyst, and when present streams of comonomer, chain transfer agent and solvent are passed to the polymerisation reactor. A product stream, such as the first stream of the first solution or the second stream of the second solution, comprising the unreacted monomer, dissolved polymer and eventual unreacted comonomer and chain transfer agent as well as the eventual solvent is withdrawn from the reactor.

A product stream, such as the first stream of the first solution or the second solution, is withdrawn from each polymerisation reactor, such as the first polymerisation reactor and the second polymerisation reactor. The streams may be passed into the subsequent process stages, such as to the heating steps or to the separation step, as separate streams or they may be combined at a suitable location.

The first stream of the first solution or the second solution each preferably contains from 10 to 35% by weight polymer, more preferably from 12 to 30% by weight polymer, most preferably from 15 to 25% by weight polymer, based on the total weight content of the first stream of the first solution or the first stream of the second solution.

First Recycle

The first recycle recovers the most volatile compounds from the polymer solution. This includes the monomer, hydrogen and a part of the solvent and comonomer.

The first stream of the first solution is continuously or intermittently, preferably continuously, withdrawn from the first polymerisation reactor. The first stream of the first solution is then passed to a first separation step where a first liquid phase comprising the polymer and a first vapour phase coexist.

The solution may be separated in any process step where volatile compounds can be withdrawn from the solution. Typically such a process step involves pressure reduction and preferably also heating of the solution. One typical example of such a process step is flashing. For instance, the first stream of the first solution is heated and then passed along a pipe to a receiving vessel which is operated at a pressure which is substantially lower than the pressure in the polymerisation reactor. Thereby a part of the fluid contained in the solution evaporates and is withdrawn as the first vapour stream. The part remaining in the solution with the polymer forms the first concentrated solution stream.

Preferably the first stream of the first solution is heated so that a heated stream is produced. Typically, the temperature of the heated stream is from 200° C. to 300° C., preferably from 200° C. to 260° C. and more preferably from 210° C. to 230° C., when the polymer is a homo- or copolymer of ethylene. The temperature of the heated stream is typically from 200° C. to 300° C., preferably from 210° C. to 270° C. and more preferably from 220° C. to 250° C., when the polymer is a homo- or copolymer of propylene. Preferably the temperature of heated stream is from 10° C. to 120° C., more preferably from 20° C. to 100° C. greater than the temperature of the solution in the polymerisation reactor.

In a preferred embodiment the first stream of the first solution is heated in two heating steps.

The purpose of the first heating step is to preheat the first stream of the first solution before it enters the first separation step.

The first heating step is suitably conducted in a heat exchanger. For instance, the first stream of the first solution is distributed in a number of tubes and a heating fluid is passed to contact the tubes thereby heating the solution flowing therein.

The purpose of the first heating step is to recover the heat from the process streams thereby improving the economy of the process.

The heating fluid may be any process fluid which contains recoverable heat. Preferably the vapour stream recovered from the separation step is used as the heating fluid. During the process the heating fluid, e.g. the vapour stream, is cooled. It is preferred to withdraw so much heat form the vapour stream that at least a part of the vapour stream condenses in the first heating step.

Typically the temperature of the first stream of the first solution before entering the first heating step is from 120° C. to 240° C., preferably from 140° C. to 220° C., most preferably from 150° C. to 200° C., when the polymer is a homo- or copolymer of ethylene. Typically the temperature of the first stream of the first solution before entering the first heating step is from 120° C. to 250° C., preferably from 140° C. to 235° C., most preferably from 150° C. to 225° C., when the polymer is a homo- or copolymer of propylene.

The temperature of the first stream of the first solution immediately downstream of the first heating step is from 160° C. to 240° C., preferably from 170° C. to 220° C., most preferably from 180° C. to 200° C., when the polymer is a homo- or copolymer of ethylene. The temperature of the first stream of the first solution immediately downstream of the first heating step is from 200° C. to 250° C., preferably from 210° C. to 250° C., most preferably from 220° C. to 250° C., when the polymer is a homo- or copolymer of propylene.

The temperature of the heating medium, like the vapour stream, prior to entering the first heating step is preferably from 120° C. to 240° C.

The purpose of the second heating step is to heat the first stream of the first solution to a required temperature for the separation step. The second heating step is required because the recoverable heat in the heating medium in the first heating step may be insufficient for reaching the desired temperature of the first stream of the first solution.

The second heating step may be conducted by using similar principles as the first heating step. However, the temperature of the heating fluid used in the second heating step is suitably controlled to a temperature which allows heating of the the first stream of the first solution to the desired temperature. Thereby it is preferred that the stream of the heating fluid used in the second heating step is heated to a desired temperature prior to introducing it into the second heating step.

According to one embodiment of the invention the temperature of the the first stream of the first solution is measured downstream of the first heating step and the flow rate of the heating fluid used in the second heating step is adjusted based on the difference between the measured temperature and the desired temperature of the first stream of the first solution.

The temperature of the first stream of the first solution downstream of the second heating step is typically from 200° C. to 300° C., preferably from 200° C. to 260° C. and more preferably from 210° C. to 230° C., when the polymer is a homo- or copolymer of ethylene. The temperature of the first stream of the first solution downstream of the second heating step is typically from 200° C. to 300° C., preferably from 210° C. to 270° C. and more preferably from 220° C. to 250° C., when the polymer is a homo- or copolymer of propylene.

It is preferred that the pressure of the first stream of the first solution is not substantially affected by any of the heating steps, be it the single heating step or the first and second heating step. The pressure is suitably from 50 to 300 bar, preferably from 60 to 250 bar and more preferably from 70 to 200 bar.

The heated first stream of the first solution is passed to the separation step where the temperature and pressure are adjusted such that a liquid phase and a vapour phase are obtained. The polymer is dissolved in the liquid phase which comprises a part of the eventual solvent and a part of the eventual unreacted comonomer while most part of the unreacted monomer, eventual unreacted chain transfer agent, eventually a part of the unreacted comonomer, and eventually, a part of the solvent form the vapour phase.

The temperature in the separation step is suitably within the range of from 120° C. to 240° C., preferably from 140° C. to 220° C. and more preferably from 150° C. to 200° C., when the polymer is a homo- or copolymer of ethylene. The temperature in the separation step is suitably within the range of from 120° C. to 240° C., preferably from 140° C. to 220° C. and more preferably from 150° C. to 200° C., when the polymer is a homo- or copolymer of propylene.

The pressure of the first stream of the first solution is reduced to 1 to 15 bar, preferably from 2 to 12 bar and more preferably from 5 to 10 bar. The pressure is preferably reduced so that it is at least from about 40 bar to about 295 bar lower than the pressure in the polymerisation reactor.

In a preferred aspect the first separating step is a flashing step. Thereby a liquid phase and a vapour phase are present in the first separating step. The flashing step is suitably conducted in a flash vessel which is a vertical vessel preferably having a generally cylindrical shape. Thereby the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The temperature in the flash vessel is typically from 120 to 240° C. The temperature should be sufficiently high to keep the viscosity of the solution at a suitable level but less than the temperature where the polymer is degraded. The pressure in the flash vessel is typically from 15 bar to atmospheric, or even less than atmospheric.

The solution stream enters the flash vessel at the top. The solution travels downwards in the flash vessel while the gases which evaporate from the solution travel upwards. According to this preferred aspect the polymer solution forms a thin film which falls downwards in the flash vessel. This facilitates the removal of hydrocarbons from the polymer solution. The gases are typically withdrawn from the top of the flash vessel while the solution is withdrawn from the bottom.

According to an especially preferred aspect the first stream of the first solution is sprayed in the flash vessel. The spraying can be done by using one or more suitable nozzles which disperse the solution stream into droplets. Such nozzles are well known in the industry and include air atomising nozzles, flat fan nozzles, hollow cone nozzles and full cone nozzles. Preferably the nozzles break the stream into droplets having the size of not more than about 1 mm.

The nozzle forms a stream of droplets in the flash vessel. The stream of droplets then coagulates within the flash vessel and forms a falling film having a relatively high surface area. This enhances the mass transfer of the volatile components from the solution. As described above the flash vessel can have a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle it moves in the direction of the wall forming a downwards falling film. It is also possible that the flash vessel has a vertical generally conical shape. In such aspect it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements the polymer solution forms a falling film within the flash vessel.

The polymer content in solution stream withdrawn from the first flashing stage is typically from 40 to 90% by weight, preferably from 50 to 80% by weight, most preferably from 60 to 75% by weight, based on the total weight content of the solution stream. In other words, the product stream withdrawn from the first flashing stage contains from 10 to 60% by weight, preferably from 20 to 50% by weight, most preferably from 25 to 40% by weight of residual hydrocarbons, based on the total weight content of the solution stream.

When viewed from a different angle, the hydrocarbon stream withdrawn from the flash vessel is from 35 to 80% by weight from the total material streams withdrawn from the flash vessel. The hydrocarbon stream typically comprises unreacted monomer and also solvent and unreacted comonomer.

By using the flash as described above it is possible to achieve high separation efficiency. For instance, separation efficiency for hydrocarbons containing 6 carbon atoms is at least 75% and preferably at least 80%. Additionally still, separation efficiency for hydrocarbons containing 8 carbon atoms is at least 60% and preferably at least 65%. The separation efficiency is defined as the mass flow of the component withdrawn in the vapour stream divided by the (theoretical) mass flow rate of the component in the vapour stream in equilibrium conditions.

The first concentrated solution stream contains the polymer, dissolved in solvent and unreacted comonomer. It may also contain residual monomer which still remains in the solution. Typically the polymer concentration in the first concentrated stream is from 30% by weight to 70% by weight, preferably from 38% by weight to 60% by weight, most preferably from 45% by weight to 55% by weight, greater than the polymer concentration in the first stream of the first solution. The first concentrated solution stream is then typically in liquid phase. The first concentrated solution stream may, however, contain a minor amount of vapour, such as vapour bubbles. The amount of vapour in the first concentrated stream is typically not more than 40% by weight, preferably not more than 30% by weight and especially preferably not more than 20% by weight, such as not more than 10% by weight or not more than 5% by weight.

The first vapour stream contains unreacted monomer and other volatile compounds, such as hydrogen. The first vapour stream also contains some of the solvent and comonomer. The first vapour stream can optionally comprise a small amount of liquid droplets and polymer particles. The amount of such droplets/polymer particles is typically not more than 40% by weight, preferably not more than 30% by weight and especially preferably not more than 20% by weight.

The first vapour stream is passed to a first fractionator for separating the liquid droplets and polymer particles from the first vapour stream. The light components, such as ethylene and hydrogen, are withdrawn as the first overhead stream from the first fractionator. At least a part of the first overhead stream is recovered as a first recycle stream and is returned to the first polymerisation reactor. Suitably, the first recycle stream is passed via purification steps for removing eventual moisture and oxygen before it is returned to the polymerisation reactor.

At least a part of the first bottom stream from the first fractionator is returned to the first separation step. By returning a part or the entire first bottom stream to the first separation step (and thereby to the first concentrated solution stream) it is ensured that the viscosity of the first bottom stream is not too high giving problems with pumping More importantly, polymer which is eventually entrained in the first vapour stream is conveniently returned to the first concentrated solution stream. Thereby fouling of the piping and the process equipment in the upstream monomer and solvent recycle system is reduced.

The first fractionator may be any device where the light components can be separated from the liquid droplets and polymer particles. It is suitably a distillation column or a stripping column. The vapour is recovered at the top of the column and preferably passed to a condenser. A part of the vapour stream is then condensed in the condenser while a part remains in vapour phase. A part of the condensed stream is suitably returned to the first fractionator and the remaining part is returned to the polymerisation reactor. The uncondensed vapour, containing mainly hydrogen and other light gas, may be disposed of or it may be returned to the polymerisation reactor. Where there are more than one polymerisation reactors the uncondensed vapour may be returned to such polymerisation reactor which allows the highest content of light components.

In the first recycle preferably the mass flow rate of the first recycle stream is at least 80% of the mass flow rate of the first vapour stream and more preferably the mass flow rate of the first recycle stream is at least 90% of the mass flow rate of the first vapour stream.

Parallel Polymerisation Reactor Configuration:

In the parallel polymerisation reactor configuration in the same way as the first stream of the first solution also the first stream of the second solution is continuously or intermittently, preferably continuously, withdrawn from the second polymerisation reactor. The first stream of the second solution is then passed to a separation step where a part of fluid contained in solution is withdrawn from the first stream of the second solution. Thereby the concentrated solution stream and the vapour stream are produced.

In the case of two or more reactors in parallel polymerisation reactor configuration it is possible to combine the first stream of the first solution and the first stream of the second solution before they are passed to the first separating step. In such a case they are suitably mixed upstream of the heating step(s). However, it is also possible to pass each of the first stream of the first solution and the first stream of the second solution to a dedicated separating step, thereby producing two or more concentrated solution streams. If that is done, then it is preferred to combine the concentrated solution streams before they are passed to a subsequent separating step.

In any of these embodiments the conditions of the heating step(s) and the separation step are preferably the same as described above.

Second Recycle

The second recycle recovers further volatile compounds from the polymer solution. This includes a major part of the solvent and comonomer.

The first concentrated solution stream is passed to the second separation step where a part of the fluid contained in the solution evaporates and is withdrawn as the second vapour stream. The part remaining in the solution with the polymer forms the second concentrated solution stream.

The second separation step may be conducted in any process step where remaining volatile compounds can be withdrawn from the solution. Typically such a process step involves pressure reduction and heating of the solution. The second separation step may be conducted in a similar way as the first separation step, such as by flashing.

Optionally the first concentrated solution stream is heated. Typically, the temperature of the optionally heated first concentrated stream is from 200° C. to 300° C., preferably from 220° C. to 280° C. and more preferably from 240° C. to 260° C., when the polymer is a homo- or copolymer of ethylene. Typically, the temperature of the optionally heated first concentrated stream is from 200° C. to 300° C., preferably from 220° C. to 280° C. and more preferably from 240° C. to 260° C., when the polymer is a homo- or copolymer of propylene.

The pressure of the first concentrated stream prior to entering the second separation step is typically more than 20 bar, preferably more than 25 bar and most preferably more than 30 bar.

The heated first concentrated solution stream is passed to the second separation step where the temperature and pressure are adjusted such that a liquid phase and a vapour phase are obtained. The polymer is dissolved in the liquid phase which comprises a part of the eventual solvent and a part of the eventual unreacted comonomer while most part of the unreacted monomer, eventual unreacted chain transfer agent, eventually a part of the unreacted comonomer, and eventually, a part of the solvent form the vapour phase.

The temperature in the second separation step is suitably within the range of from 190° C. to 260° C., preferably from 200° C. to 250° C. and more preferably from 210° C. to 230° C., when the polymer is a homo- or copolymer of ethylene. The temperature in the separation step is suitably within the range of from 190° C. to 260° C., preferably from 200° C. to 250° C. and more preferably from 210° C. to 230° C., when the polymer is a homo- or copolymer of propylene.

The absolute pressure of the first concentrated solution stream is reduced to a pressure within the range of from 0.5 bar to 10 bar, preferably from 0.8 bar to 5 bar, most preferably from 0.9 to 2 bar in the second separation step. The pressure is preferably reduced so that the pressure in the second separation step is at least from about 10 bar to about 24 bar lower than the pressure of the heated first concentrated solution stream.

The second separation step is preferably conducted as a flashing step. It is also preferred that the inlet of the second separation step comprises at least one mixing step. The mixing step is suitably conducted in a static mixer. Thus, in a preferred aspect the first concentrated stream is heated after which it is passed through a static mixer to a flash vessel.

The mixing step improves the separation efficiency. Further, it is simple and economical to install and operate.

It is possible to introduce a stream of a stripping agent to the first concentrated solution stream. The stream of the stripping agent is then suitably introduced to the first concentrated solution stream upstream of the eventual mixing step. The stripping agent may be any compound which assists in removing hydrocarbons from the polymer and which does not react with the polymer, such as water, nitrogen or carbon dioxide. Preferably water, creating steam, is used as the stripping agent.

The second concentrated solution stream contains the polymer, dissolved in unreacted comonomer and some residual solvent. Suitably the polymer concentration in the second concentrated solution stream is from 80 to 100% by weight, preferably from 95 to 99.5% by weight, most preferably from 98 to 99% by weight. Typically the difference between the polymer concentration in the second concentrated solution stream and the polymer concentration in the first concentrated solution stream is from about 20% by weight to about 30% by weight.

The second vapour stream contains solvent and some unreacted comonomer. It may also contain a minor amount of residual monomer and hydrogen, which may have remained in the solution after the first separation step. This vapour stream can also contain liquid droplets and polymer particles.

The second vapour stream is passed to a second fractionator for separating liquid droplets and polymer particles from the second vapour stream. The light components, such as the solvent, possibly containing residual ethylene and hydrogen, are withdrawn as the overhead stream from the second fractionator. At least a part of the second overhead stream is recovered as a second recycle stream and is returned to at least one of the first polymerisation reactor and the second polymerisation reactor.

The bottom stream from the second fractionator is returned to the first separation step. By returning the bottom stream to the upstream separation step (and thereby to the first concentrated solution stream) it is ensured that the viscosity of the circulating bottom stream of the fractionator remains at a sufficiently low level. Thereby pumping and transferring the circulating bottom stream of the fractionator can be done without difficulty. More importantly, entrainment of polymer into the streams which are recycled to the polymerisation reactor is effectively prevented. Thereby fouling of the recovery lines and equipment is reduced.

The second fractionator may be any device suitable for separating the light components from the liquid droplets and polymer particles. As discussed above for the first fractionator it is suitably a distillation column or a stripping column. The overhead stream is recovered at the top of the column and preferably passed to a condenser. A part of the overhead stream is then condensed in the condenser while a part remains in vapour phase. The non-condensed fraction of the overhead stream may be disposed of, or alternatively it can be returned into the polymerisation reactor. A part of the condensed stream is suitably returned to the second fractionator and the remaining part is returned to the polymerisation reactor.

In the second recycle preferably the mass flow rate of the second recycle stream is at least 65% of the mass flow rate of the second vapour stream and more preferably the mass flow rate of the second recycle stream is at least 70% of the mass flow rate of the second vapour stream.

In the case of two or more polymerisation reactors it is possible that a part or all of the second recycle stream is recycled to any of the polymerisation reactors. According to a preferred aspect a part of the second recycle stream is recycled to the first polymerisation reactor and the rest of the second recycle stream is recycled to the second polymerisation reactor.

Parallel Polymerisation Reactor Configuration:

In the parallel polymerisation reactor configuration the solution streams from the reactors are combined before the first or the second recycle like explained before.

In one aspect the first stream of the first solution from the first polymerisation reactor and the first stream of the second solution from the second polymerisation reactor are combined before the second separation step. The first stream of the second solution is withdrawn from the second reactor and passed to the fourth separator. The fourth concentrated solution stream and the fourth vapour stream are formed. The fourth concentrated solution stream is passed to the second separator and thereby combined with the first concentrated solution stream. The fourth vapour stream is passed to the fourth fractionator. The fourth overhead stream and the fourth bottom stream are formed. At least a part of the fourth overhead stream is recovered as the fourth recycle stream and is returned to the second polymerisation reactor. At least part of the fourth bottom stream from the fourth fractionator is returned to the fourth separator. Otherwise the recycle from the fourth separator is similar to the first recycle from the first separator.

In the recycle from the fourth separator preferably the mass flow rate of the fourth recycle stream is at least 80% of the mass flow rate of the fourth vapour stream and more preferably the mass flow rate of the fourth recycle stream is at least 90% of the mass flow rate of the fourth vapour stream.

In any of these embodiments the conditions of the heating step(s) and the separation step are preferably the same as described above.

Third Separation Step

With the third separation a third recycle can be conducted. The third recycle recovers remaining volatile compounds from the polymer solution. This includes a major part of the comonomer. These components typically make up the third vapour stream.

The second concentrated stream is passed to the third separation step where the third vapour stream is withdrawn from the second concentrated stream. Thereby the third concentrated stream and the third vapour stream are produced.

The third separation step may be conducted in a similar fashion as the second separation step, such as by flashing.

Optionally the second concentrated stream is heated. Typically, the temperature of the heated second concentrated stream is from 210° C. to 300° C., preferably from 230° C. to 280° C. and more preferably from 240° C. to 270° C., when the polymer is a homo- or copolymer of ethylene. Typically, the temperature of the optionally heated second concentrated stream is from 210° C. to 300° C., preferably from 230° C. to 280° C. and more preferably from 240° C. to 260° C., when the polymer is a homo- or copolymer of propylene.

The pressure of the second concentrated stream prior to entering the third separation step is typically more than 20 bar, preferably more than 25 bar and most preferably more than 30 bar.

The temperature in the third separation step is suitably within the range of from 190° C. to 260° C., preferably from 200° C. to 250° C. and more preferably from 210° C. to 230° C., when the polymer is a homo- or copolymer of ethylene. The temperature in the separation step is suitably within the range of from 190° C. to 260° C., preferably from 200° C. to 250° C. and more preferably from 210° C. to 230° C., when the polymer is a homo- or copolymer of propylene.

If the third separation step is conducted as a flashing step then the pressure of the second concentrated stream is reduced to a range within from 0 to 1 bar (gauge pressure), preferably from 0 to 0.2 bar (gauge pressure), most preferably from 0 to 0.1 bar (gauge pressure) in the third separation step. The pressure is preferably reduced so that the pressure in the third separation step is at least from 0.8 to 4 bar lower than the pressure of the heated second concentrated stream.

If the third separation step is conducted as a flashing step, then it is also preferred that the inlet of the third separation step comprises at least one mixing step. The mixing step is suitably conducted in a static mixer. Thus, in a preferred aspect the first concentrated stream is heated after which it is passed through a static mixer to a flash vessel or a flash pipe.

It is preferred to introduce a stream of a stripping agent to the second concentrated stream. The stream of the stripping agent is then suitably introduced to the second concentrated stream upstream of the mixing step. The stripping agent may be any compound which assists in removing hydrocarbons from the polymer and which does not react with the polymer, such as water, nitrogen or carbon dioxide. Preferably water, creating steam, is used as the stripping agent.

The third concentrated stream contains the molten polymer and some residual volatile compounds. Typically the content of volatile compounds in the third concentrated stream is up to 1% by weight, preferably up to 0.5% by weight, more preferably up to 500 ppm by weight. Especially preferably the content of volatile compounds in the third concentrated stream is up to 250 ppm by weight, such as within the range of from 10 ppm by weight to 150 ppm by weight.

The third vapour stream typically contains unreacted comonomer and residual solvent. It may also contain traces of monomer which may have remained in the solution after the upstream separation steps.

The third vapour stream is passed to a third fractionator for fractionating the third vapour stream. The light components, such as the solvent, are recovered as the overhead stream from the third fractionator and are passed, for instance, to gas recovery and solvent purification. The bottom stream is then suitably passed to a further fractionator. The overhead stream from the further fractionator is passed to the comonomer storage. The bottom stream from the further fractionator may be disposed of.

Similarly to the second fractionator, also the third and the further fractionators may be any devices suitable for separating the light components from the liquid droplets and polymer particles, such as distillation columns or wash columns.

It is also possible to conduct the third separation step in an extruder. Thereby the stream of the olefin polymer containing the volatile hydrocarbons is passed to the extruder. The extruder may be any extruder known in the art, such as a single screw extruder; a twin screw extruder, such as a co-rotating twin screw extruder or a counter-rotating twin screw extruder; or a multi-screw extruder, such as a ring extruder. Especially preferably extruder is a twin screw extruder. Such extruders are well known in the art and are supplied, for instance, by Coperion, Kobe Steel, Japan Steel Works, Krauss Maffei Berstorff and Leisteritz.

The extruder typically comprises a feed zone, a mixing zone, a pressure zone, a degassing zone and a die zone. Further, the melt pressed through the die is typically solidified and cut to pellets in a pelletiser.

The extruder has one or more evacuation, or vent, ports for removing gaseous components from the extruder. Such gaseous components include residual solvent or unreacted monomer or comonomer or decomposition products thereof. Suitably the evacuation port is located within the downstream end of the melting zone or within the mixing zone.

A stripping agent, such as water, carbon dioxide or nitrogen, is suitably added to the extruder to assist in removing the volatile components, such as unreacted comonomer, from the polymer melt. Such stripping agent, when used, is added upstream of the evacuation port or upstream of the most downstream evacuation port, if there are multiple evacuation ports.

The extruder may also have one or more feed ports for feeding further components, such as polymer, additives and the like, into the extruder. The location of such additional feed ports depends on the type of material added through the port.

The temperature in the mixing zone can be rather low. Suitably, the temperature is below 280° C.

As it was discussed above, it is preferred to remove gaseous material from the extruder via one or more evacuation ports or, as they are sometimes called, vent ports. The gaseous material is typically residual solvent or comonomer. Venting of gaseous material from the extruder is well known in the industry and is discussed, for instance, in the above-mentioned book of Chris Rauwendaal, in paragraphs 8.5.2 and 8.5.3.

It is also possible to add a stripping agent, such as water, $CO_2$ or $N_2$, into the extruder. Such stripping agent, when used, is introduced upstream of the vent port or, when there are multiple vent ports, upstream of the most downstream vent port and downstream of the upstream vent port. Stripping is discussed, among others, in paragraph 8.5.2.4 of the book of Chris Rauwendaal.

Usually, when using an extruder the third vapour stream is not passed to a third fractionator but passed to gas distillation.

The die zone typically comprises a die plate, which is sometimes also called breaker plate and which is a thick metal disk having multiple holes. The holes are parallel to the screw axis. The molten olefin polymer is pressed through the die plate. The molten polymer thus forms a multitude of strands. The strands are then passed to the pelletiser.

The function of the die plate is to arrest the spiralling motion of the polymer melt and force it to flow in one direction.

The die zone may also comprise one or more screens which are typically supported by the die plate. The screens are used for removing foreign material from the polymer melt and also for removing gels from the polymer. The gels are typically undispersed high molecular weight polymer, for instance, cross-linked polymer.

The strands of molten polymer are passed through the die plate into the pelletiser. Usually, the pelletiser comprises a water bath and a set of rotating knives adjacent to the die plate. The strands are cooled and solidified in the water and the rotating knives cut the strands to pellets. The size of the pellets can be adjusted by selecting a suitable number of knives and selecting a suitable rotation speed.

The water temperature in the pelletiser is typically from 0 to 90° C., and preferably from 10 to 70° C. A stream of water, into which the pellets are suspended, is withdrawn from the pelletiser. The pellets are separated from the water stream after which they are dried and recovered. The water stream is passed to a cooling step and returned into the pelletiser. Optionally, fresh water is added to the water stream for compensating losses.

DESCRIPTION OF THE FIGURES

FIG. 1 is an exemplary representation of a process where polymerisation is conducted in a single polymerisation reactor configuration and shows two subsequent recycles. The third separation step is conducted in an extruder.

Figure 2:
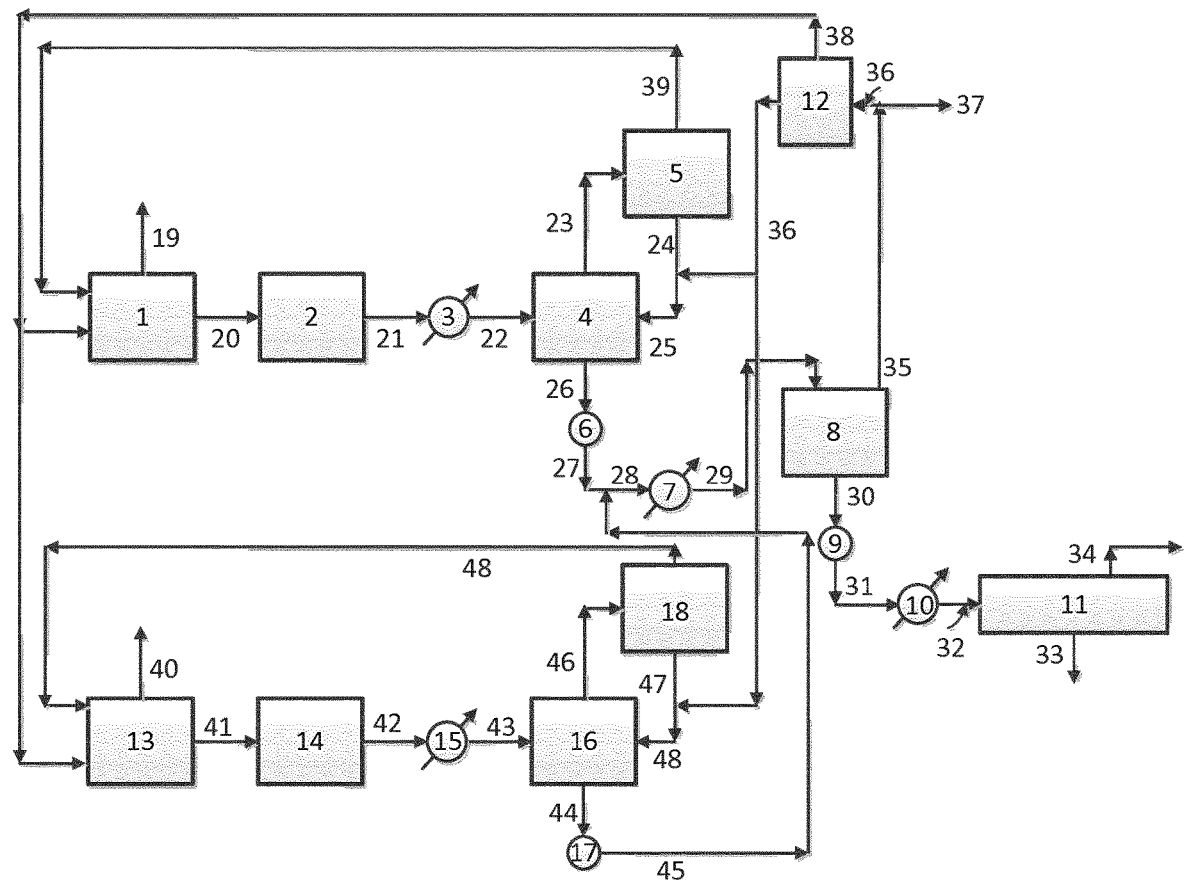
FIG. 2 shows a flow diagram for recovery of the unreacted monomer and comonomer and the solvent in a parallel polymerisation reactor configuration comprising two polymerisation reactors connected in parallel configuration. The first, second and fourth overhead streams are recycled to the polymerisation reactors.

FIG. 2 is an exemplary representation of a process where polymerisation is conducted in two parallel polymerisation reactors and recovery of feedstocks is done in two subsequent recycles. The third separation step is conducted in an extruder.

In FIG. 1 the monomer, the comonomer and the solvent are introduced to the first feed vessel (1) and passed through the line (20) to the first polymerisation reactor (2). The first stream of the first solution is withdrawn from the first polymerisation reactor (2) and passed through the line (21), the heat exchanger (3) and the line (22) to the first separator (4). The first vapour stream and the first concentrated solution stream are withdrawn from the first separator. The first vapour stream is passed to the first fractionator (5) through the line (23). The first overhead stream and the first bottom stream are withdrawn from the first fractionator (5). The first overhead stream is recovered as the first recycle stream and is recycled through the line (39) to the first feed vessel (1). The first bottom stream from the first fractionator (5) is sent back to the first separator (4) through the lines (24) and (25). The first concentrated solution stream from the first separator (4) is passed through the line (26), the pump (6), the lines (27) and (28), the heat exchanger (7) and the line (29) to the second separator (8). The second vapour stream and the second concentrated solution stream are withdrawn from the second separator (8). The second vapour stream is passed to the second fractionator (12) through the lines (35) and (36). The second overhead stream and the second bottom stream are withdrawn from the second fractionator (12) via lines 38 and 36, respectively. The second overhead stream is recovered as the second recycle stream and is recycled through the line (38) to the first feed vessel (1) or the second feed vessel (13) or both of them. A part of the second vapour stream from the second separator (8) can be directed to the gas distillation through the line (37). Preferably less than 35% of the second vapour stream is directed to the gas distillation and more preferably less than 30% of the second vapour stream is directed to the gas distillation. The second bottom stream is suitably passed along the line (36) and suitably at least a part of it is combined with the first bottom stream. The second concentrated solution stream is passed through the line (30), pump (9), line (31), heat exchanger (10) and line (32) to the extruder (11) where the most of the remaining hydrocarbons are separated from the polymer. The vapour stream from the extruder (11) is directed to gas distillation and the polymer is extruded. Optionally (11) can also be an additional separator.

In FIG. 2 a second polymerisation reactor (14) is operated parallel to the first polymerisation reactor (2). The monomer, the comonomer and the solvent are introduced to the second feed vessel (13) and passed through the line (41) to the second polymerisation reactor (14). The first stream of the second solution is withdrawn from the second polymerisation reactor (14) and passed through the line (42), the heat exchanger (15) and the line (43) to the fourth separator (16). The fourth vapour stream and the fourth concentrated solution stream are withdrawn from the fourth separator. The fourth vapour stream is passed to the fourth fractionator (18) through the line (46). The fourth overhead stream and the fourth bottom stream are withdrawn from the fourth fractionator (18). The fourth overhead stream is recovered as the fourth recycle stream and is recycled through the line (48) to the second feed vessel (13). The fourth bottom stream from the fourth fractionator (18) is sent back to the fourth separator (16) through the lines (47) and (48). Suitably at least a part of the second bottom stream is combined with the fourth bottom stream. The fourth concentrated solution stream from the fourth separator (16) is passed through the line (44), the pump (17), the lines (45) and (28), the heat exchanger (7) and the line (29) to the second separator (8).

Advantages of the Invention

The present invention reduces the required energy consumption for the recovery of hydrocarbons in a solution polymerisation process. In the process most of the unconsumed monomer and comonomer and the solvent are recycled directly back to the polymerisation reactors. Thereby only a minor portion of the hydrocarbons are directed to the gas distillation. Since the distillation requires a lot of energy, the reduction in the distillation amounts means that the energy consumption is substantially reduced.

EXAMPLES

Computer simulations were performed using Aspen 8.8 computer software. In the simulation ethylene and 1-butene were polymerised in n-hexane in a polymerisation reactor. In Example 1 hydrocarbons were recycled via first and second recycle and in Comparative Example 1 hydrocarbons were recycled only via first recycle. Comparison of the process flows and energy consumption are shown in Table 1.

TABLE 1

|  | E1* | CE1** |
| --- | --- | --- |
| Gas flow to distillation | 2200 kg/h | 4720 kg/h |
| Energy requirement for solvent/1-butene distillation | 0.41 MW | 0.91 MW |
| Ethylene to distillation | 40 kg/h | 100 kg/h |
| 1-Butene to distillation | 200 kg/h | 500 kg/h |
| Hexane to distillation | 54 kg/h | 100 kg/h |

*100% of the first recycle stream was sent to the first polymerisation reactor + 60% of the second recycle stream was sent to the first polymerisation reactor
**100% of the first recycle stream was sent to the first polymerisation reactor From the comparison it can be seen that the total gas flow to distillation (kg/h) is reduced to ca. half with Example 1. It is obvious that when the gas flow is reduced also the energy consumption of the distillation section is reduced. This can be seen for instance from the energy requirement for the solvent/1-butene distillation column; energy requirement for CE1 is more than double compared to E1.

In a further simulation, performed using Aspen 8.8 computer software, the process according to the invention is compared to the process described in WO 2015/040522 A1. In the simulation ethylene and 1-butene were polymerised in n-hexane in a polymerisation reactor.

Thereby, for comparative examples CE2 and CE3 the process described in WO 2015/040522 A1 FIG. 1 was followed. The polymer rich bottom stream was concentrated in three separation steps (20, 26, 28). The gaseous overhead streams (21, 29, 31), withdrawn from each of said separation steps, were subjected to distillation. Several assumptions had to be made: The polymer concentration after the first separation step (20) is between 40-60% by weight (40 wt % for CE2 and 60 wt % for CE3). This can be concluded from the minimum pressure in the vessel which is disclosed to be 10 barg. Example E2 follows the process shown in FIG. 1 of the present application. Thereby, hydrocarbons were recycled via first and second recycle. Comparison of the process flows in the different stages are shown in Table 2.

For all examples CE2, CE3 and E2 the composition of the solution withdrawn from the reactor was the same:
21.2 wt % ethylene/1-butene copolymer
0.9 wt % unreacted ethylene
77.9 wt % n-hexane solvent and unreacted 1-butene comonomer The following conditions were assumed for the examples:
CE2 and CE3:
In the first separation step pressure in the separator was assumed 10 barg which results in a polymer concentration of 40 to 60 wt % as discussed above. For the second and third separation step it was assumed that the second and third separator combined are 100% efficient independent of temperature and pressure.
E2:
For the first separation step it was assumed that the temperature at the inlet of the separator was 230° C. and the pressure in the first separator was 8 barg.
For the second and third separation step it was assumed that the second separator was 95% efficient so that the bottom liquid stream contains 5 wt % solvent.

TABLE 2

|  | CE2 | CE3 | E2 |
| --- | --- | --- | --- |
| First separation |  |  |  |
| Overhead vapour stream | 47.0 wt % | 64.5 wt % | 67.5 wt % |
| Polymer | 0 wt % | 0 wt % | 0 wt % |
| Ethylene | 2.8 wt % | 1.5 wt % | 1.4 wt % |
| Solvent + comonomer | 97.2 wt % | 98.5 wt % | 98.6 wt % |
| Bottom liquid stream | 53.0 wt % | 35.5 wt % | 32.5 wt % |
| Polymer | 40 wt % | 60 wt % | 65 wt % |
| Ethylene | 0 wt % | 0 wt % | 0 wt % |
| Solvent + comonomer | 60 wt % | 40 wt % | 35 wt % |
| Second + Third Separation |  |  |  |
| Overhead vapour stream |  |  |  |
| Polymer | 0 wt % | 0 wt % | 0 wt % |
| Solvent + comonomer | 100 wt % | 100 wt % | 100 wt % |
| Bottom liquid stream |  |  |  |
| Polymer | 100 wt % | 100 wt % | 95 wt % |
| Solvent + comonomer | 0 wt % | 0 wt % | 5 wt % |

In Table 3 the total flow rates of the total amount of liquids to recycle back to the reactor and to distillation/recovery are shown.

TABLE 3

|  | CE2 | CE3 | E2 |
| --- | --- | --- | --- |
| To reactor via recycle | 41 wt % | 18 wt % | 98 wt % |
| To distillation/recovery | 59 wt % | 82 wt % | 2 wt % |

The process according to the invention has a higher energy efficiency due to a lower amount of liquid that is passed to distillation/recovery.

The invention claimed is:

1. A process for producing a polymer composition comprising the steps of:
(A) polymerizing, in a first polymerization reactor (2) in a first solvent,
a first olefin monomer having two or more carbon atoms and
optionally a first comonomer,
in the presence of a first polymerization catalyst and
optionally a chain transfer agent for producing a first solution comprising a first polymer of the first olefin monomer and the optional first comonomer and the first solvent;

(B) withdrawing a first stream of the first solution from the first polymerization reactor (2);

(C) passing the first stream of the first solution into a first separator (4) wherein a first liquid phase comprising the polymer and a first vapor phase coexist;

(D) withdrawing a first vapor stream and a first concentrated solution stream comprising the polymer from the first separator (4);

(E) passing at least a part of the first vapor stream to a first fractionator (5);

(F) withdrawing a first overhead stream and a first bottom stream from the first fractionator (5);

(G) recovering at least a part of the first overhead stream as a first recycle stream and passing it to the first polymerization reactor (2);

(H) passing the first concentrated solution stream from the first separator (4) to a second separator (8) wherein a second liquid phase comprising the polymer and a second vapor phase coexist;

(I) withdrawing a second vapor stream and a second concentrated solution stream comprising the polymer from the second separator (8);

(J) passing at least a part of the second vapor stream to a second fractionator (12);

(K) withdrawing a second overhead stream and a second bottom stream from the second fractionator (12);

(L) recovering at least a part of the second overhead stream as a second recycle stream and passing it to the first polymerization reactor (2);

(M) passing the second concentrated solution stream from the second separator (8) to a third separator (11) wherein a third liquid phase comprising the polymer and a third vapor phase coexist;

characterised in that the mass flow rate of the first recycle stream is at least 80% of the mass flow rate of the first vapor stream and the mass flow rate of the second recycle stream is at least 70% of the mass flow rate of the second vapor stream.

2. The process according to claim 1 wherein the first bottom stream is passed from the first fractionator (5) back to the first separator (4).

3. The process according to claim 1 wherein at least a part of the second bottom stream is passed from the second fractionator (12) back to the first separator (4).

4. The process according to claim 1 comprising the additional steps of:
(N) passing at least a part of the third vapor stream to a third fractionator;
(O) withdrawing a third overhead stream and a third bottom stream from the third fractionator;
(P) passing at least a part of the third overhead stream to solvent recovery.

5. The process according to claim 1 comprising the additional steps of:
(Q) passing the first recycle stream and optionally at least a part of the second recycle stream to a first feed vessel (1);
(R) withdrawing a first feed stream from the first feed vessel (1);
(S) passing the first feed stream via a first cooling step to the first polymerization reactor (2).

6. The process according to claim 1 comprising the additional steps of:
(T) polymerizing, in a second polymerization reactor (14) in a second solvent,
a second olefin monomer having two or more carbon atoms and
optionally a second comonomer,
in the presence of a second polymerization catalyst and optionally a chain transfer agent for producing a second solution comprising a second polymer of second olefin monomer and the optional second comonomer and the second solvent;
(U) withdrawing a first stream of the second solution from the second polymerization reactor (14);
(V) passing the first stream of the second solution into a fourth separator (16) wherein a fourth liquid phase comprising the polymer and a fourth vapor phase coexist;
(W) withdrawing a fourth vapor stream and a fourth concentrated solution stream comprising the polymer from the fourth separator (16);
(X) passing at least a part of the fourth vapor stream to a fourth fractionator (18);
(Y) withdrawing a fourth overhead stream and a fourth bottom stream from the fourth fractionator (18);
(Z) recovering at least a part of the fourth overhead stream as a fourth recycle stream and passing it to the second polymerization reactor (14);
(AA) passing the fourth concentrated solution stream from the fourth separator (16) to the second separator (8) wherein the second liquid phase comprising the polymer and the second vapor phase coexist;
characterised in that the polymerization in the first polymerization reactor (2) in step (A) and the polymerization in the second polymerization reactor (14) in step (T) are conducted in parallel configuration; and
the mass flow rate of the fourth recycle stream is at least 80% of the mass flow rate of the fourth vapor stream.

7. The process according to claim 6 wherein the fourth bottom stream is passed from the fourth fractionator (18) back to the fourth separator (16).

8. The process according to claim 6 wherein at least a part of the second bottom stream is passed from the second fractionator (12) to the fourth separator (16).

9. The process according to claim 6 comprising the additional steps of:
(AB) passing the fourth recycle stream and optionally at least a part of the second recycle stream to a second feed vessel (13);
(AC) withdrawing a second feed stream from the second feed vessel (13);
(AD) passing the second feed stream via a second cooling step to the second polymerization reactor (14).

10. The process according to claim 1 comprising the additional steps of:
(T') polymerizing, in a second polymerization reactor (14) in a second solvent,
a second olefin monomer having two or more carbon atoms and
optionally a second comonomer,
in the presence of a second polymerization catalyst and optionally a chain transfer agent for producing a second solution comprising a second polymer of second olefin monomer and the optional second comonomer and the second solvent;
(U') withdrawing a first stream of the second solution from the second polymerization reactor (14);

(V') combining the first stream of the second solution from the second polymerization reactor (14) with the first stream of the first solution from the first polymerization reactor (2) to produce a combined first stream of the first solution and the second solution;

(W) passing the combined first stream of the first solution and the second solution into a first separator (4) wherein a first liquid phase comprising the polymer and a first vapor phase coexist;

characterised in that the polymerization in the first polymerization reactor (2) in step (A) and the polymerization in the second polymerization reactor (14) in step (T') are conducted in parallel configuration.

11. The process according to claim 6 wherein the first solvent and the second solvent are the same.

12. The process according to claim 6 wherein the first comonomer and the second comonomer are the same.

13. The process according to claim 6 wherein the first polymerization catalyst and the second polymerization catalyst are the same.

14. The process according to claim 1 wherein the first olefin monomer and optionally the second olefin monomer are the same and are ethylene or propylene.

15. The process according to claim 1 wherein the first comonomer or optionally the second comonomer or optionally the first comonomer and the second comonomer is selected from the group consisting of alpha-olefins different from the olefin monomer having from 2 to 10 carbon atoms; polyenes, such as non-conjugated alpha-omega-dienes, having from 4 to 10 carbon atoms, cyclic olefins having from 6 to 20 carbon atoms and cyclic polyenes having from 6 to 20 carbon atoms.

16. The process according to claim 1 wherein the first and second separators (4), (8) and the optional fourth separator (16) are flash units.

17. The process according to claim 1 wherein the first separator (4) and the optional fourth separator (16) are operated at a pressure of from 5 to 15 bar and the second separator (8) is operated at a pressure of from 1 to 5 bar.

18. The process according to claim 1 wherein the first and second fractionators (5), (12) and the optional fourth fractionator (18) are distillation columns or stripping columns.

* * * * *